United States Patent
Rankin

(10) Patent No.: US 6,615,676 B2
(45) Date of Patent: Sep. 9, 2003

(54) POWER STEERING BELT TENSIONING APPARATUS AND METHOD

(75) Inventor: Brent C Rankin, Lima, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/933,428

(22) Filed: Aug. 20, 2001

(65) Prior Publication Data

US 2003/0033864 A1 Feb. 20, 2003

(51) Int. Cl.$^7$ ................................................. G01L 5/04
(52) U.S. Cl. ................. 73/862.41; 73/118.1; 73/119 R; 73/862.453
(58) Field of Search ............................... 73/116, 118.1, 73/119 R, 570, 572, 579, 826, 828, 862.381, 862.391, 862.41, 862.42, 862.451, 862.453, 862.59

(56) References Cited

U.S. PATENT DOCUMENTS

| | | | |
|---|---|---|---|
| 4,565,099 A | 1/1986 | Arnold | |
| 4,655,093 A | 4/1987 | Strom et al. | |
| 4,928,538 A | 5/1990 | Burdess et al. | |
| 5,435,191 A | * 7/1995 | Kawachi | 73/862.41 |
| 5,698,796 A | 12/1997 | Hirano | |
| 5,877,431 A | 3/1999 | Hirano | |
| 6,019,692 A | * 2/2000 | Kojima et al. | 474/87 |
| 6,216,547 B1 | * 4/2001 | Lehtovaara | 73/862.391 |
| 6,356,848 B1 | * 3/2002 | Cote et al. | 702/44 |

\* cited by examiner

Primary Examiner—Eric S. McCall
(74) Attorney, Agent, or Firm—Rankin, Hill, Porter & Clark LLP; Alan T. McDonald; Vincent Ciamacco

(57) ABSTRACT

A method and system for tensioning a belt, the system including a tensioning measuring head, a controller, and an air impact gun. The tension measuring head includes a vibration sensor and a belt striker. The controller activates the belt striker and receives signals from the vibration sensor indicative of the vibrations set up in the belt being tensioned. The measured vibrations are indicative of the tension on the belt, and are used by the controller to deactivate the air impact gun when the belt tension is determined to be at a desired level.

14 Claims, 3 Drawing Sheets

POWER STEERING BELT TENSIONING APPARATUS AND METHOD

BACKGROUND OF THE INVENTION

1. Field of the Invention

The present invention is directed toward manufacturing and assembly techniques and, more particularly, toward an automated method for tensioning an automobile power steering belt.

2. Description of Related Art

During assembly of automobile engines, it is necessary to install various accessory devices on the engine and to connect at least some of these accessory devices to rotary power from the engine. For example, the air conditioning compressor and the power steering pump must be mounted adjacent the engine and connected, via pulleys and belts, to the engine crank shaft pulley.

Conventionally, an adjustable mount is provided to permit the pump to be moved relative to the crank shaft pulley to vary the tension on the belt. As such, this portion of the manufacturing process is manual, and depends greatly upon the skill of the assembler. If the tension on the belt is not enough (i.e., belt too slack), the belt may slip. If the tension on the belt is too great (i.e., belt too tight), the belt may wear prematurely. Accordingly, setting the belt to the proper tension has largely been based upon the "feel" of the assembler, which is the result of experience and individual perceptions that is difficult, if not impossible, to standardize among different assemblers. Moreover, switching of belt materials, which may require relatively more or less tension, is problematic due to the tendency of assemblers to continue to set the belt tension in the manner in which they are accustomed.

Therefore, there exists a need in the art for a method and device to automate setting of the belt tension.

SUMMARY OF THE INVENTION

The present invention is directed toward a method and apparatus to automate and standardize the setting of tension on a belt.

In accordance with the invention, a belt tensioning apparatus is provided as a station on the automobile assembly line. Palletized engines are directed to the belt tensioning station and are released from the station after having their belt(s) appropriately tensioned.

In accordance with a method of the present invention, a vibration sensor is placed adjacent the belt and a tensioning device, which is operable to increase tension on the belt, is activated. The belt is thereafter struck to cause the belt to vibrate. The belt vibrations are measured with the vibration sensor and a frequency of the measured belt vibrations is compared with a predetermined desired vibration frequency. If the measured vibration frequency is below the predetermined desired vibration frequency, the belt tensioning, striking and vibration measuring continues. When the measured vibration frequency is equal to or greater than the predetermined desired vibration frequency, the tensioning device is deactivated. The predetermined desired vibration frequency corresponds to a predetermined belt tension.

In further accordance with the method of the present invention, following deactivation of the tensioning device, a final belt tension check is performed wherein the belt is struck at least one further time to cause the belt to further vibrate. The further vibrations are measured by the vibration sensor and a frequency of the further belt vibrations are compared to a predetermined range of belt vibration frequencies. If the further belt vibration frequency is within the predetermined range of desired belt vibrations, the belt tension is determined to be acceptable.

In accordance with a belt tensioning system of the present invention, a belt striker, vibration sensor, tension controller, and tensioning device are provided. The tension controller is operable to activate the belt striker and to receive measured belt vibration signals from the vibration sensor. The tension controller compares a frequency of the measured belt vibrations with a predetermined desired belt vibration frequency. The tension controller is also operable to activate and deactivate the belt tensioning device in response to measured vibration frequency. When the measured vibration frequency is below the predetermined desired belt vibration frequency, the tensioning device is activated to increase tension on the belt and, when the measured vibration frequency is equal to or greater than the predetermined desired vibration frequency, the tensioning device is deactivated by the tension controller.

In further accordance with the present invention, the belt striker and vibration sensor are carried on a tension measuring head. The tension measuring head also includes a proximity sensor that is in communication with the tension controller and operable to indicate to the tension controller when the tension measuring head is properly positioned relative to the belt to be tensioned.

In further accordance with the present invention, the tensioning device is an air driven gun, and the system further includes a solenoid air control valve. The tension controller is operable to open the solenoid air control valve to activate the air driven gun and to close the solenoid air control valve to deactivate the air driven gun.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
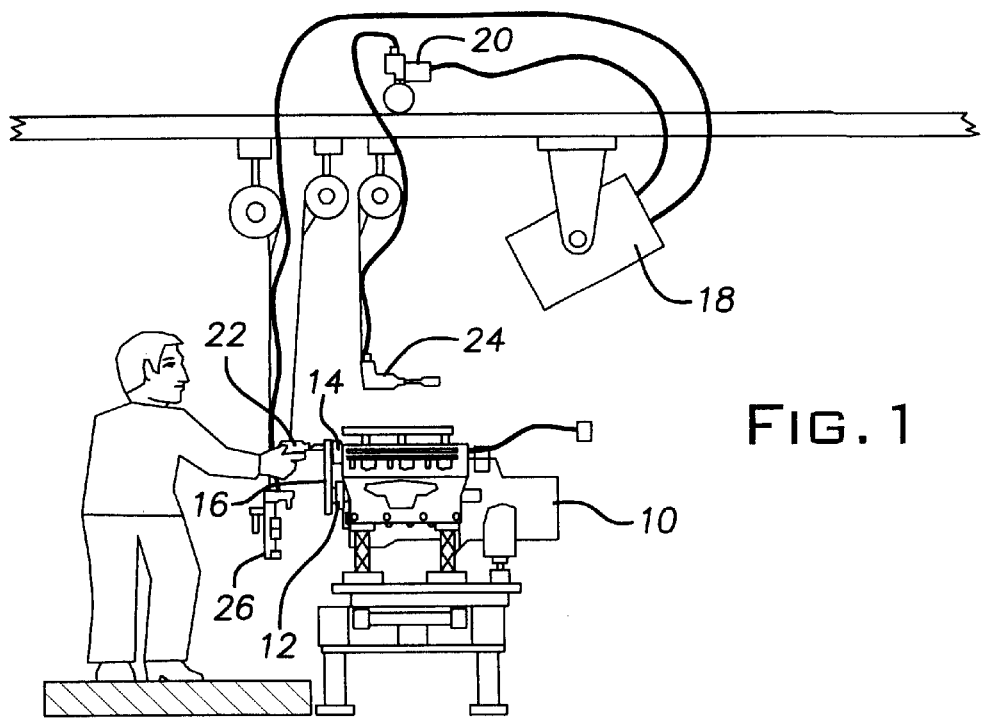
FIG. 1 is a schematic illustration of a belt tensioning station according to the present invention, with the operator tightening the retainer bolts to a predetermined tension immediately prior to placement of a tension measuring head relative to the belt being tensioned.
Figure 2:
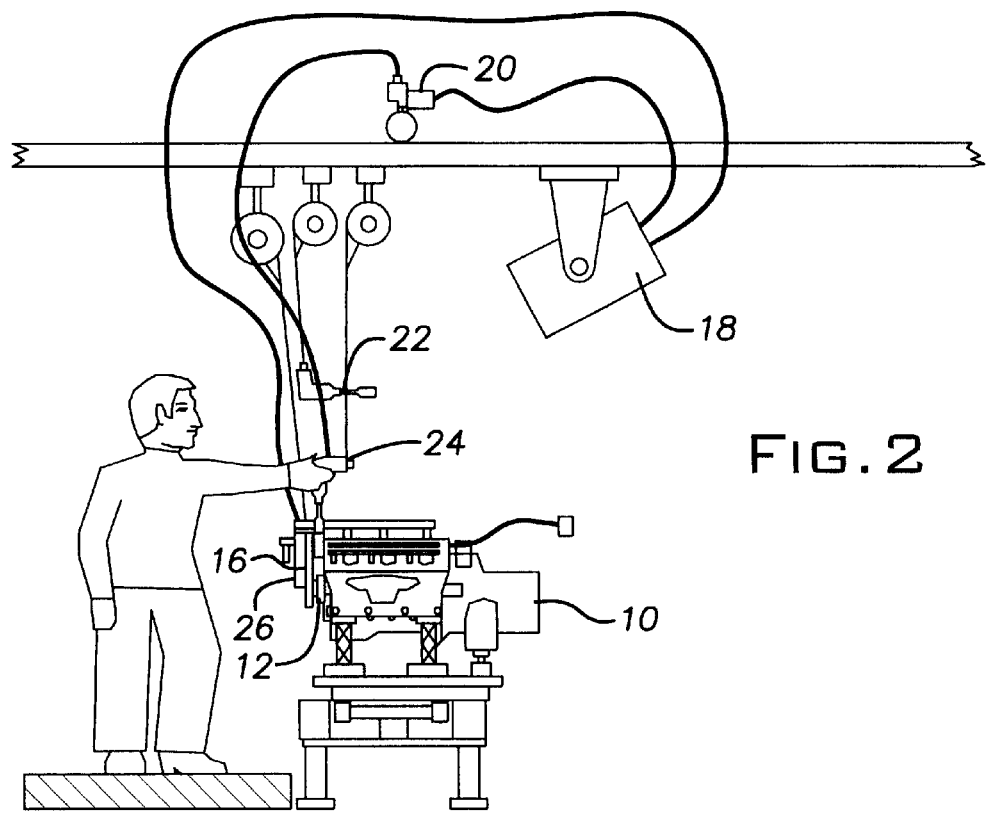
FIG. 2 is a schematic illustration of the belt tensioning station of FIG. 1 with the tension measuring head on the belt and with the operator tightening the tension adjustment bolt.

The system is described hereinafter as it relates to properly tensioning a power steering pump belt. Moreover, the preferred and illustrated system is described hereinafter in its intended operating environment as a work station of an automotive assembly line. However, it is considered apparent that the system and method of the present invention could be equally useful in tightening other automotive belts, and could also be useful in non-automotive environments.

The system is adapted for use in conjunction with an engine 10, which includes a pulley 12 mounted on the crank shaft. A power steering pump, which includes a pulley 14 and an adjustable mount, is secured to the engine 10. The adjustable mount is used to tension a power steering pump belt 16, which is wrapped around the crank shaft pulley 12 and power steering pump pulley 14 and is operable to transfer rotary motion from the crank shaft pulley 12 to the power steering pump pulley 14.

Conventionally, the power steering pump adjustable mount includes retainer bolts that may be threadably secured to the engine 10, and a pulley tensioning bolt that is used to adjust the distance or spacing of the power steering pump pulley from the crank shaft pulley and thereby adjust the tension on the pump belt. It is believed that the structure and method of mounting the power steering pump on the engine 10 is conventional and well known in the art and, therefore, will not be discussed in detail hereinafter. Moreover, insofar as the present invention is not limited to any specific pump and pulley arrangement, the present invention is clearly not limited to the structural features of the engine described and illustrated herein.

The power steering belt tensioning system includes a tension controller 18, a solenoid control valve 20, a first air-driven impact gun 22, a second air-driven impact gun 24, and a tension measuring head 26. The tension controller 18 includes a programmable logic controller 28 (hereinafter PLC 28) and a tension control unit 30 communicating with a power supply 31.

The first impact gun 22 is used to tighten the pump retainer bolts, and will hereinafter be referred to as the retainer bolt impact gun 22. The second impact gun 24 is used to tighten the power steering pump belt tensioning bolt, and will hereinafter be referred to as the belt tensioning impact gun 24. Each of the impact guns is pneumatic or air driven. However, the retainer bolt impact gun 22 is connected to an available shop air line, while the supply of air to the belt tensioning impact gun 24 is controlled by a solenoid control valve 20 which, in turn, is actuated by the tension controller 18, as will be discussed hereinafter.

Figure 3:
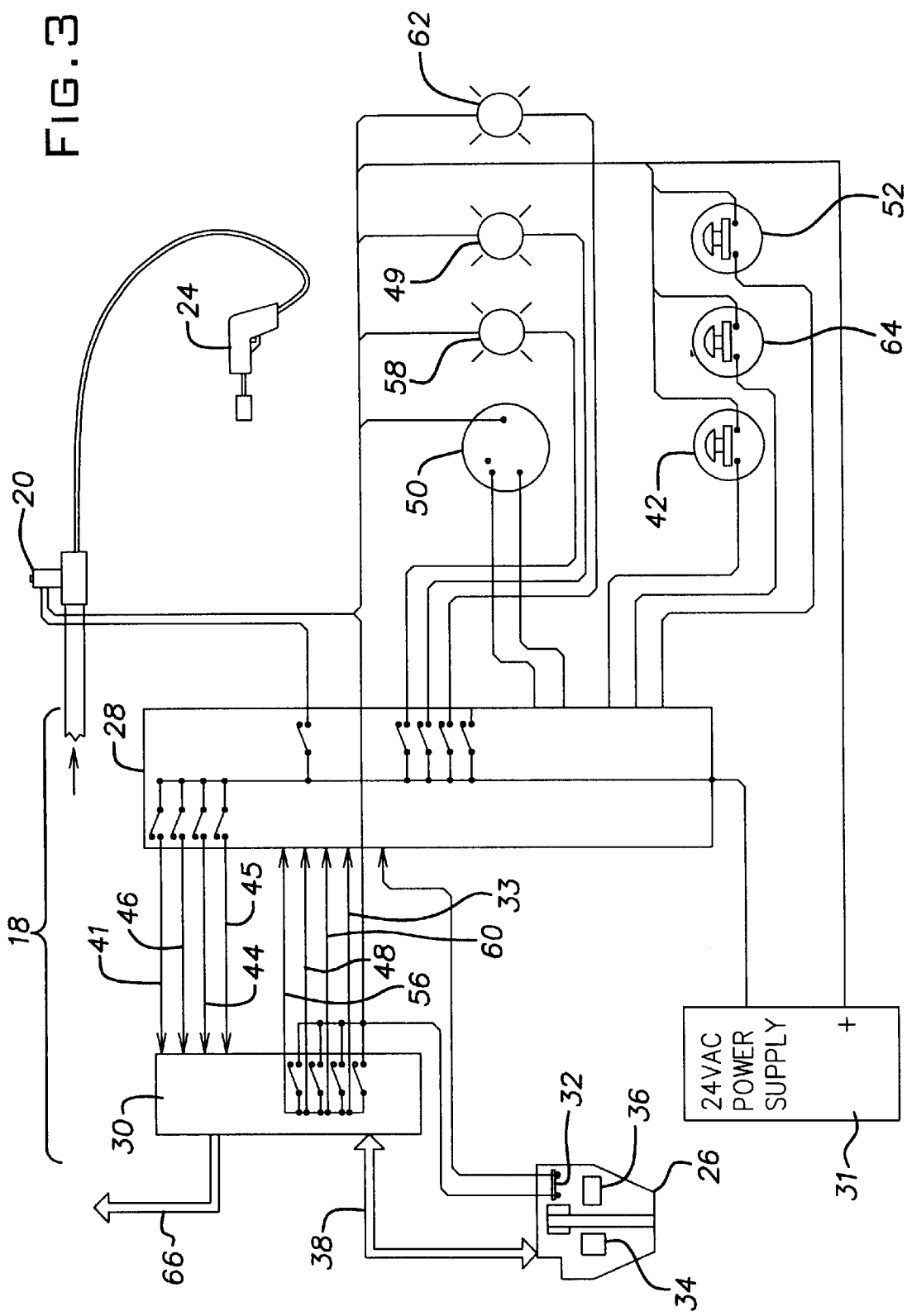
FIG. 3 schematically illustrates the electrical communication between the system components of the present invention; and, FIG. 4 is a flow chart of the operating sequence according to the method of the present invention.

The general operation of the belt tensioning system will be discussed hereinafter primarily with reference to the drawing of FIG. 3 and the flowchart of FIG. 4.

The tension measuring head 26 includes a proximity switch 32, a belt striking solenoid 34, and a vibration sensor 36. Two-way communication of various electrical signals between the tension control unit 30 and the measuring head 26 is provided via a cable 38. The PLC 28 directly receives a proximity signal from the measuring head 26, and also communicates with the tension control unit 30. The PLC 28 is operable to provide visual and aural indication, via lights and speaker(s) to the operator. These indicators are preferably provided on a conveniently arranged display (FIG. 1). The PLC 28 is further operable to provide tactile feedback, via the belt second tensioning gun 24, that indicates to the operator that a primary belt tensioning has been completed, as will be clear from the following discussion. The PLC 28 also receives environmental and process information via a series of position switches and operator-actuated switches.

The pump and engine 10 are prepared for belt tensioning (FIG. 4, Step 100) by placing the pump on the engine. The retaining bolts are tightened to a first predetermined torque to hold the pump on the engine, and the belt is placed around the pulleys.

Figure 4:
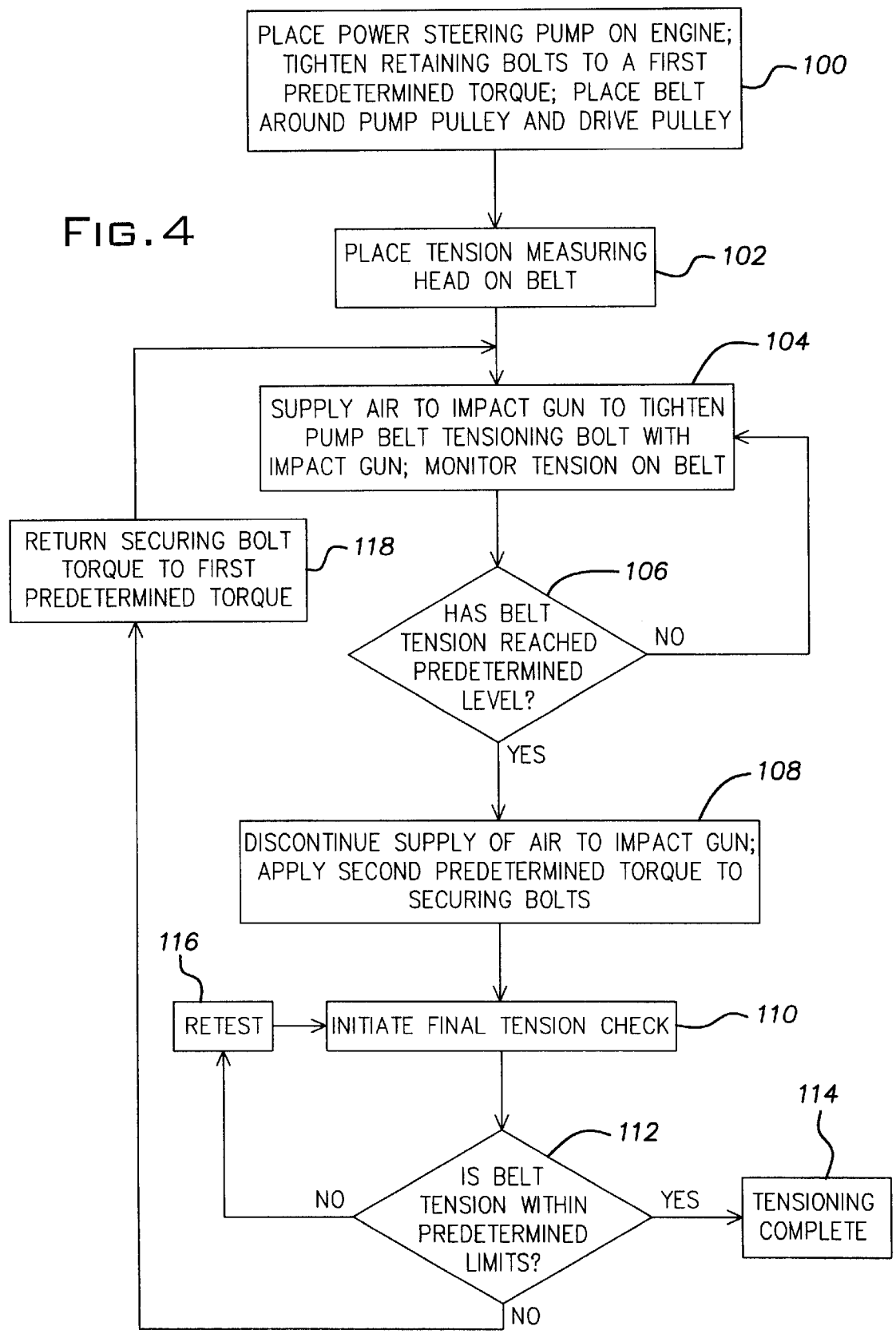

The tension measuring head is then placed on the belt (FIG. 4, Step 102). The proximity sensor 32 detects when the tension measuring head 26 is in place relative to the belt 16 to be tensioned, and sends a start signal to the PLC 28. The PLC 28 also receives a measuring head set signal from the tension control unit 30, via line 33, indicating that the tension measuring head 26 is in place. When the PLC 28 receives the first start signal and the tension measuring head set signal, it initiates the primary belt tensioning by sending two signals to the control unit (via lines 41 and 44) to begin continuous detection and measurement of the belt tension.

During the primary belt tensioning (FIG. 4, Step 104), the PLC 28 activates the solenoid control valve 20 to supply air to the belt tensioning impact gun 24, thereby allowing the operator to turn the belt tensioning bolt to increase the tension on the belt 16. Simultaneously, the tension control unit 30 sends pulses to the belt striking solenoid 34, causing the striking solenoid 34 to repeatedly strike the belt 16 which, in turn, causes the belt to vibrate at a frequency that is proportional to the tension on the belt 16. The vibrations developed in the belt 16 are sensed by the vibration sensor 36, and signals corresponding to the sensed vibration are sent to the tension control unit 30. The tension control unit 30 converts the measured vibrations into vibration frequency signals that are compared to a predetermined desired vibration frequency, which is correlated to the desired belt tension. Therefore, as the operator turns the tensioning bolt to increase the tension on the belt 16, the increasing belt tension is monitored by the tension control unit 30.

The tension control unit 30 includes memory that has stored therein a vibration frequency corresponding to a desired predetermined belt tension. The tension control unit 30 continuously compares the measured belt vibration frequency (tension) to the predetermined desired belt vibration frequency (tension; FIG. 4, Step 106). When the measured belt vibration frequency is equal to the predetermined desired vibration frequency, the tension control unit 30 sends a signal to the PLC 28 to end the primary belt tensioning. In response to this signal, the PLC 28 turns off or closes the solenoid control valve 20, shutting off air to the tensioning impact gun 24, and causing the gun 24 to become inoperable to further tension the belt 16 (FIG. 4, Step 108).

Turning off the air to the impact gun 24 is readily perceived by the operator, even in loud environments, and tells the operator that the desired tension has, at least preliminarily, been achieved. Thereafter, the retainer impact gun 22 is used by the operator to tighten the pump retaining bolts, which are thereafter tightened, preferably using a torque wrench (not shown), to a second or final predetermined desired torque to secure the pump to the engine 10.

Once the retainer bolts are at the final desired torque, the operator presses the final check button 42, which sends signals to the PLC 28 to activate the tension control unit 30 for the final tension check (FIG. 4, Step 110). More specifically, the PLC 28 sends a pass tension range signal (via line 45) and a single measurement signal (via line 46) to the tension control unit 30. The tension control unit 30 initiates a final belt tension check by activating the belt striking solenoid 34 once. The resulting vibration, which corresponds to the power steering belt tension, is sensed by the vibration sensor 36 and compared to a predetermined and preset range of values stored in the tension control unit memory (FIG. 4, Step 112). If the power steering belt vibration frequency is within the predetermined range, the tensioning process is complete (FIG. 4, Step 114). Accordingly, the tension control unit 30 returns a signal (via line 48) to the PLC 28 which, in turn, illuminates the tension OK indicator 49. Assuming that the pallet release switch 50 is in the automatic position, the PLC 28 releases the engine 10 so that it can proceed down the assembly line. If the pallet release switch 50 is in the manual position, the pallet will wait until the operator pushes the pallet out button 52.

If the measured vibration frequency is below the predetermined range, the belt tension is too low. Accordingly, the tension control unit 30 sends a "slack" signal (via line 56) to the PLC 28 which, in turn, illuminates a "slack" indicator 58. Alternatively, if the measured vibration frequency is above the predetermined range, the belt tension is too great. Accordingly, the tension control unit 30 sends a "tight" signal (via line 60) to the PLC 28 which, in turn, illuminates a tight indicator 62.

If the final belt tension check results are not OK, i.e., "slack" or "tight", the operator may retest the belt tension by pressing the retry button 64, which will re-initiate the final belt tension check (FIG. 4, Step 116). Alternatively, or assuming that the belt tension remains "slack" or "tight" after the retry, the operator can repeat the tension testing procedure (i.e., by loosening the retainer bolts to the first predetermined torque, etc.; FIG. 4, Step 118). As a further alternative, the operator may send the engine 10 to another station adapted to handle tensioning problems. Since the belt is too slack or too tight, the engine 10 will not be released until the operator presses the pallet out button 52.

It is noted that the tension control unit 30 has a data output cable 66, preferably an RS232 output line. Such data output will help coordinate the tensioning of belts, and may be used to associate or tag the tension data to each engine, as will be helpful in routing the engines having "slack" or "tight" belts for further adjustment.

The present invention has been described herein with particularity, but it is noted that the scope of the invention is not limited thereto. For example, although the preferred and illustrated device for tightening the bolts is an air driven impact gun, it is contemplated that other devices, such as electric drills, may be used, in which case the control unit/PLC will cut off power to the drills when the desired belt tension has been reached. Also, it is contemplated that the various indicators and operator-actuatable buttons and switches may be conveniently provided on the display screen. Therefore, the present invention is considered to be possible of numerous modifications, alterations, and combinations of parts and, therefore, is only defined by the claims appended hereto.

What is claimed is:

1. A method for tensioning a belt, comprising the steps of:
   a) placing a vibration sensor adjacent the belt;
   b) activating a tensioning device, said tensioning device being operable to increase a tension on the belt;
   c) striking the belt to cause said belt to vibrate;
   d) measuring the belt vibration with the vibration sensor;
   e) comparing a frequency of the measured vibration with a predetermined vibration frequency; and,
      if said measured vibration frequency is below the predetermined vibration frequency, repeating steps b) through e);
      if said measured vibration frequency is equal to or greater than the predetermined vibration frequency, deactivating said tensioning device.

2. The method according to claim 1, wherein said tensioning device includes an air drive device, said air drive device being activated and deactivated by supplying and cutting-off, respectively, pressurized air thereto.

3. The method according to claim 1, wherein, following deactivation of said tensioning device, a final belt tension check is performed, said final belt tension check comprising the further steps of:
   striking the belt at least once to cause the belt to further vibrate;
   measuring the further belt vibration with the vibration sensor;
   comparing a frequency of the measured further belt vibration with a predetermined range of acceptable belt vibration frequencies; and,
   indicating to an operator whether said belt tension is acceptable.

4. The method according to claim 3, wherein the indicating step includes:
   indicating to the operator if the belt tension is too slack, acceptable, or too tight.

5. The method according to claim 4, wherein, if the belt tension is acceptable, terminating the tensioning process and, if the belt tension is too slack or too tight, re-testing the belt tension.

6. A method for tensioning a belt, comprising:
   performing a primary tensioning comprising the steps of;
   a) placing a vibration sensor adjacent the belt;
   b) activating a tensioning device, said tensioning device being operable to increase a tension on the belt;
   c) striking the belt plural times to cause said belt to vibrate;
   d) measuring the belt vibration with the vibration sensor;
   e) comparing a frequency of the measured vibration with a predetermined vibration frequency; and,
      if said measured vibration frequency is below the predetermined vibration frequency, repeating steps b) through e);
      if said measured vibration frequency is equal to or greater than the predetermined vibration frequency, deactivating said tensioning device;
   following deactivation of said tensioning device, performing a final belt tension check comprising the steps of:
   f) striking the belt at least one additional time to cause said belt to further vibrate;
   g) measuring the further vibrations with the vibration sensor;
   h) comparing a frequency of the further measured vibrations, which corresponds to a tension on said belt, with a predetermined range of acceptable vibration frequencies, said range of acceptable vibration frequencies corresponding with a range of acceptable belt tensions; and,
   i) indicating to an operator whether a tension of said belt is acceptable.

7. The method according to claim 6, wherein said tensioning device includes an air drive device, said device being activated and deactivated by supplying and cutting-off, respectively, pressurized air thereto.

8. The method according to claim 7, wherein said belt is a power steering pump that is mounted on an engine and said method is performed at an automobile assembly line station, and wherein, if the belt tension is acceptable, releasing said engine for further assembly.

9. The method according to claim 6, wherein, if the belt tension is unacceptable, permitting the operator to re-test the belt tension by repeating the final tensioning of steps f) through i).

10. The method according to claim 9, wherein said tensioning device includes an air drive device, said device being activated and deactivated by supplying and cutting-off, respectively, pressurized air thereto.

11. The method according to claim 10, wherein said belt is a power steering pump that is mounted on an engine and said method is performed at an automobile assembly line station, and wherein, if the belt tension is acceptable, releasing said engine for further assembly.

12. A belt tensioning system, comprising:
a belt striker;
a belt vibration sensor;
a tension controller that is operable to activate the belt striker and to receive measured belt vibration signals from the vibration sensor, said tension controller comparing a frequency of the measured belt vibrations with a predetermined belt vibration frequency; and
a belt tensioning device, said device being controlled by said tension controller in response to sensed vibration frequency such that, when said measured vibration frequency is below said predetermined belt vibration frequency, said tensioning device is activated to increase tension on said belt and, when said measured vibration frequency is equal to or greater than said predetermined vibration frequency, said tensioning device is deactivated.

13. The belt tensioning system according to claim 12, wherein said belt striker and said belt vibration sensor are carried on a tension measuring head, said tension measuring head further comprising a proximity sensor that is in communication with the tension controller and operable to indicate to the tension controller when the tension measuring head is properly positioned relative to the belt to be tensioned.

14. The belt tensioning system according to claim 12, wherein the tensioning device is an air driven gun, and said system further comprises a solenoid air control valve, said tension controller opening said solenoid air control valve to activate said air driven gun and closing said solenoid air control valve to deactivate said air driven gun.

* * * * *